Patented Apr. 22, 1924.

1,491,561

UNITED STATES PATENT OFFICE.

ARTHUR C. SPENCER, OF WASHINGTON, DISTRICT OF COLUMBIA, ASSIGNOR TO THE PERMUTIT COMPANY, OF NEW YORK, N. Y., A CORPORATION OF DELAWARE.

PROCESS OF IMPROVING GLAUCONITE.

No Drawing. Application filed May 5, 1923. Serial No. 637,010.

*To all whom it may concern:*

Be it known that I, ARTHUR C. SPENCER, a citizen of the United States, residing at Washington, in the District of Columbia, have invented certain new and useful Improvements in Processes of Improving Glauconite, of which the following is a specification.

This invention relates to processes of improving glauconite and it comprises a method of improving the quality of glauconite for metathetical exchange purposes, such as processes of softening water, wherein the glauconite is heated under non-oxidizing conditions, the so-heated glauconite being usually thereafter exposed to the action of hot alkalies and water; all as more fully hereinafter set forth and as claimed.

Glauconite or greensand is a cryptocrystalline lamellar granular mineral of marine origin. In composition, the type mineral is a hydrated silicate of iron and potassium. As it occurs glauconite invariably contains both ferrous and ferric iron. Some alumina may occur, replacing $Fe_2O_3$ and similarly other bases ($Na_2O$, $CaO$, $MgO$) may replace $K_2O$ to some extent. Possibly the FeO is a replacing base. The mineral is the characteristic constituent of the greensand marls in which it occurs in admixture with many other things, clay, shells, organic matters, pyrites, etc. Ordinarily, the glauconite granules themselves are not pure. They are apt to contain included and encrusting adventitious material, generally of clayey nature. Most of the granules are of hard and rigid structure but there is generally some percentage of softer, more easily disintegrable material.

Glauconite being a granular material of relatively high specific gravity is readily separated from accompanying minerals and mechanical impurities by ordinary washing, by flotation and by other processes to give high percentage concentrates. These concentrates, however, are not as pure and as well suited for certain technical purposes as is desirable.

One of the technical purposes for which these concentrates are used is that of softening water. It has been found that glauconite can be used in removing hardness-giving impurities (lime and magnesia) from water in a way analogous to that in which the "artificial zeolites" are used—water to be softened being passed through a bed of the granular material. After a time the activity of the glauconite becomes exhausted and it can then be regenerated by the passage of a salt solution (NaCl) which removes the lime and magnesia taken up from the water, carrying them off as the corresponding chlorids. In so doing, the glauconite takes up sodium which in another operation becomes an exchangeable base. In this use glauconite offers advantages in certain relations; as with hot waters, somewhat acid waters, etc. In using glauconite concentrates for softening water in this way it is, of course, desirable that all the granules be free of foreign matter and be of hard, rigid and permanent nature; that there is as little as possible of material which will disintegrate, or wash away in the apparatus. In the softening apparatus the material is agitated more or less by alternating currents of liquid in softening and in regeneration as well as in backwashing and a durable material is required to resist the incident friction. The granules must be of such character as not to grind and flour each other.

But, as stated, even in high per cent concentrates not all the granules are hard and firm and there is generally more or less adventitious material present. It is the purpose of the invention of this application to provide a method of readily and cheaply treating glauconite concentrates to harden or get rid of soft granules and of disintegrable adventitious matter; and to do this in a way not injurious to the exchange power. Usually as a matter of fact I increase the exchange power.

On heating glauconite concentrates with free exposure to air, the soft granules are either hardened or disintegrated to material which can be removed by sifting; and the same is true of adventitious encrusting materials. But the heating leads to loss of water of constitution to a greater or less extent; the extent of course depending on the time and temperature. And it also leads to oxidation of more or less of the ferrous iron which, as noted, is an invariable constituent; the green granules becoming darker in color. This oxidation, as I have found is prejudicial to exchange activity. Other conditions being equal, in heating glauconite better products are obtained where conditions are adjusted so as to limit or prevent this oxidation.

In the present invention therefore I heat greensand or greensand concentrates under conditions precluding any substantial oxidation. Ordinarily but not necessarily, I heat in an atmosphere which is, at least, somewhat reducing. Reduction does no harm, even if rather fargoing; and in some aspects of my invention I contemplate such a fargoing reduction. As the atmosphere in which heating is effected I can use steam or products of combustion; but I prefer atmospheres containing at least some proportion of gases of a positively reducing nature such as producer gas, water gas, hydrogen, coal gas, etc. Advantageously, more or less steam or water vapor can be used in connection with the reducing gas as this limits dehydration. The $H_2O$ vapors arising from the material itself may be sufficient; and particularly where there is a constant feed of moist or undried material. The temperature in heating may be anywhere from 200° to 500° C.; but is advantageously around or below 300° C.

Unless the atmosphere used in heating is, or contains, steam, more or less water of constitution is lost in heating; the loss being the greater the longer the time or the higher the temperature. At or below 300° C. with proper care in operation there is little damage of this action going too far. To some extent, the lost $H_2O$ is reassumed when the material becomes wet again, and in any event it can be restored by exposure to alkaline solutions; advantageously hot. The heated material may be subjected to the conjoint action of alkaline solutions and steam under pressure.

The apparatus used for the present purpose may be of any convenient type. Advantageously, the material is agitated or stirred in some way during the heating, this heating being for the double purpose of giving an even exposure of surface to the chosen atmosphere and of promoting the disintegration of soft granules and of adhering non-glauconitic matter. A rotary, slightly inclined, externally heated kiln or drum of an ordinary type closed against access of air, is a convenient apparatus to use. Connections should be provided enabling control of the atmosphere within the drum. Unless substantial reduction is required, it is not ordinarily advantageous to have any marked flow of reducing gas, if such be used, through the apparatus. In a measure, the amount of dehydration at any given temperature may be controlled by the speed of passage of the gaseous atmosphere through the apparatus or the speed at which $H_2O$-containing vapors arising from the material are allowed to escape. In some embodiments of my invention where no particular reduction is desired, I may use an atmosphere of products of combustion containing $H_2O$ (steam) or I may use steam itself flowing through the apparatus. Or I may simply use a vented heating chamber, controlling the rate of escape of gases and vapors at the vent to control the atmosphere within the chamber. Steam, or an atmosphere rich in steam, has the advantage that dehydration during baking can be limited or controlled, rendering it possible to work at rather high baking temperatures without the loss of water incident to the same temperature under a free exposure to the atmosphere. The presence of at least a modicum of reducing gases is advantageous, as positively precluding oxidation. If the proportion of reducing gas be increased, fargoing reduction may be secured; even so far as the reduction of all or much of the ferric iron to ferrous iron or even to the metallic state. In the present specific embodiment of my invention however I do not desire any special reduction; I aim to preserve the chemical composition of the original glauconite, insofar as may be. Where reduction is desired and accomplished, the products of reduction may afterwards be removed to any desired extent by an acid wash.

In a specific embodiment of my invention, greensand, which may or may not have been washed or otherwise treated to remove impurities and accompanying minerals, is heated in a rotary cylindrical drum set at such an inclination as to produce a slow feed therethrough, the interior temperature in the drum going as high as, say, 300° C. and the time of exposure being usually 10 to 30 minutes, although sometimes a time of treatment as high as two hours is advantageous. Much depends upon the particular character of the particular material under treatment. During the heating, I produce a slow flow of somewhat moistened reducing gas through the apparatus. To some degree, the amount of dehydration at a given temperature in the sense of loss of chemically combined or absorbed $H_2O$ is inversely proportional to the amount of moisture in the gas atmosphere used for treatment. Where the amount of water vapor coming from the mineral is not sufficient, more is added as steam. Water occurring in greensand as moisture is all removed at atmospheric pressure by temperatures as low as 105° C., but the chemically combined or constitutional $H_2O$ requires a higher temperature for its removal. The loss of water of constitution in a given operation depends partly upon the time factor, partly upon the temperature, and partly on the "partial concentration" of $H_2O$ vapor in the particular atmosphere used. Ordinarily, I aim to arrange conditions so as to have no great loss of water of constitution during the baking treatment. Some part of the water of constitution is more firmly held than other parts and the loss of water of constitution goes on more or less stepwise. In so far as I remove water of constitution, it is my effort to remove rather the more loosely combined $H_2O$ than the more firmly combined. With the removal of the firmly bound $H_2O$, or immediately thereafter, comes a certain shrinking or condensation of the mineral with a loss of reactivity. This physical change I seek to avoid.

If the heating operation has not been too drastic, the mineral on exposure to the air, or to water, takes up much or most of the water it has lost. The baked mineral may be sized to obtain granule sizes desired. Any fines not suited for the particular purposes in mind may be discarded or used for other purposes. The fines usually contain a large proportion of the adventitious matters naturally present. The baked and sized material may be treated in various chemical ways for the purpose of further purification, as by being extracted with weak acids. Various treatments are also sometimes advisable for the purpose of rehydration and for restoring or enchancing base exchange activity. The baked glauconite may, for example, be heated for a time with a weak solution of alkali, say, caustic soda, at a boiling temperature; or it may be treated with a little alkali and exposed to steam under pressure. The material may be boiled or heated with a sodium chlorid solution or with caustic lime or with calcium chlorid. In treating with lime or calcium chlorid solution, it is advantageous to follow with a treatment with sodium chlorid.

While I regard it as best in treating greensand to free it of mechanical impurities and make a high grade concentrate prior to the baking operation, such treatments to remove mechanical impurities may follow baking.

In baking the material as described, the chemical composition of the glauconite is not substantially changed if no reduction is effected (as it may be), since heating is done under such conditions as to preclude oxidation and since, usually, the loss of $H_2O$ is restricted to that which will be reassumed after treatment with water or alkaline solution. But the material is improved in its physical characteristics, soft mineral being disintegrated or hardened. Any clay or clayey matter which may be present is rendered hard and rigid, so that it will not mud down with water. In treating the baked glauconite, various other chemical solutions may also be used, as, for instance, a solution of sodium silicate or one of aluminum sulfate or one of sodium aluminate, etc. These various chemical solutions all have more or less of a modifying action on the glauconite and in many instances they improve its exchange properties without detriment to the improved physical characteristics given by the described baking operation.

Baked (and rehydrated) glauconite made under the present invention is not substantially changed as regards chemical composition. And while after treatments with various acids, bases and salines, produces some chemical change in the granules, this change is largely superficial effecting the active surface rather than the body of granule. These superficial changes of addition, subtraction or metathesis however affect the activity or exchange power; and in many cases improve it substantially.

What I claim is:—

1. The process of improving glauconite which comprises baking glauconite in the absence of air.

2. The process of improving glauconite which comprises baking glauconite in the absence of air and presence of a reducing gas.

3. The process of improving glauconite which comprises baking glauconite in the absence of air and rehydrating the baked material.

4. The process of improving glauconite which comprises baking glauconite in the absence of air and rehydrating the baked material with the aid of an alkaline solution.

5. The process of improving glauconite which comprises baking glauconite in the absence of air and rehydrating the baked material with the aid of a hot solution of caustic soda.

6. The process of improving glauconite which comprises baking glauconite in the absence of air and subjecting the baked granular material to superficial alteration by contact with a solution if a reactive chemical.

In testimony whereof, I have hereunto affixed my signature.

ARTHUR C. SPENCER.